No. 816,858. PATENTED APR. 3, 1906.
A. M. HAM.
VEGETABLE BOILER.
APPLICATION FILED SEPT. 13, 1905.
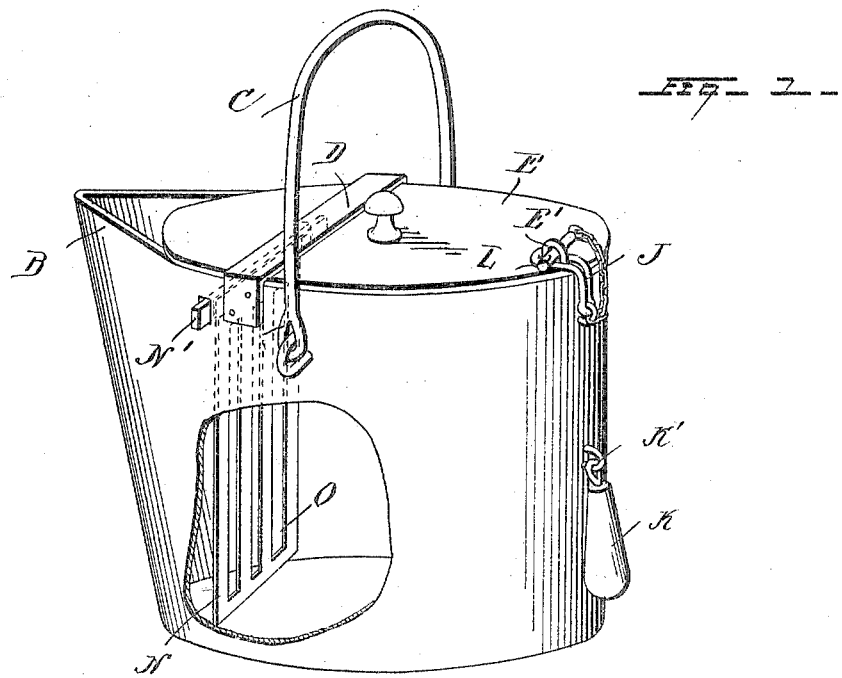
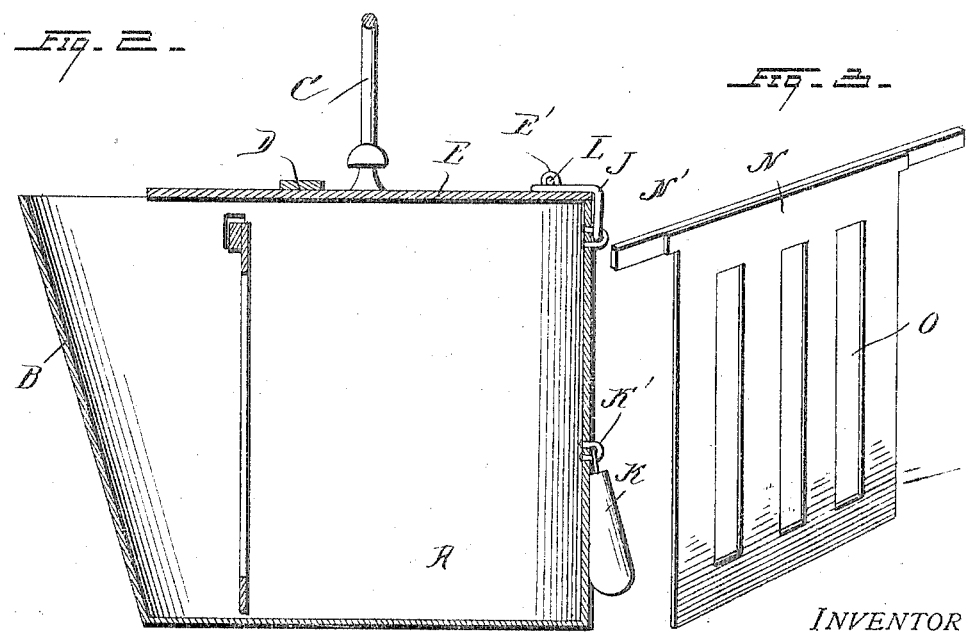
WITNESSES:
R. A. Boswell
A. L. Hough
INVENTOR
Alice M. Ham,
BY Franklin N. Hough
Attorney

UNITED STATES PATENT OFFICE.

ALICE MAUD HAM, OF KENT, WASHINGTON.

VEGETABLE-BOILER.

No. 816,858.  Specification of Letters Patent.  Patented April 3, 1906.

Application filed September 13, 1905. Serial No. 278,281.

*To all whom it may concern:*

Be it known that I, ALICE MAUD HAM, a citizen of the United States, residing at Kent, in the county of King and State of Washington, have invented certain new and useful Improvements in Vegetable-Boilers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in receptacles for boiling vegetables, and comprises means whereby the water contained within the receptacle may be conveniently poured therefrom without the vegetables interfering with the same and comprises a body portion having a nose or spout formed therein and having a swinging rack journaled in the walls of the body portion of the receptacle and arranged so that the vegetables are kept a slight distance back from the spout to allow the water to be poured from the receptacle.

The invention consists, further, in the provision of a device for boiling vegetables, &c., having a body portion with a strap extending over the top thereof at one side of the center of the receptacle and provided for the purpose of holding a cover in place.

The invention comprises other details of construction and combinations and arrangements of parts which will be hereinafter fully described and then specifically defined in the appended claims.

I illustrate my invention in the accompanying drawings, which, with the letters of reference marked thereon, form a part of this application, and in which—

Figure 1 is a perspective view of my improved vegetable-boiling receptacle. Fig. 2 is a central sectional view through the receptacle, and Fig. 3 is a detail view of the swinging rack.

Reference now being had to the details of the drawings by letter, A designates a kettle or receptacle which may be of any shape or size and provided with a nose or spout B, whereby water may be conveniently poured from the receptacle.

C designates a bail to the receptacle, and D is a strap, the ends of which are angled and fastened to the walls of the receptacle, as shown. Said strap D extends over the top of the receptacle at one side of the center thereof and is positioned a slight distance above the top of the receptacle and is provided for the purpose of holding the cover E in place upon the receptacle in case the pressure of the steam has a tendency to make the cover vibrate. The under surface of the strap is spaced above the top only a sufficient distance to snugly receive the top, which is held tightly against the receptacle by said strap.

N designates a rack the top of which has laterally-extending arms N', which are pivotally mounted in apertures formed in the walls of the receptacle. Said rack has longitudinal slots O therein, and said rack is so mounted that the lower end will free the bottom of the receptacle and is so positioned within the receptacle that its lower end will strike against the inner wall of the receptacle, leaving a space between the rack and the spout for the water to run into as the kettle is tilted and at the same time prevent the vegetables from clogging up the spout or nose.

K designates a handle which is pivotally mounted upon an eye K', fastened to the rear portion of the receptacle, and J designates a loop which is adapted to fit over an eye E' upon the cover of the receptacle, and L designates a key designed to be passed through said eye after the loop has been caught over the same for the purpose of securely holding the rear edge of the cover upon the receptacle, while the forward edge of the receptacle is securely held by said strap.

From the foregoing it will be observed that by the provision of an apparatus as shown and described a simple and efficient receptacle is provided, whereby water from the kettle may be conveniently poured off without interference from the vegetables contained therein and the cover securely held in place against accidental displacement and against pressure of steam generated within the receptacle.

Having thus fully described my invention, what I claim as new, and desire to secure by Letters Patent, is—

1. A receptacle for boiling vegetables comprising a body portion having a nose, a rack having longitudinal slots therein, the upper end of the rack having oppositely-projecting arms which are pivotally mounted in apertures in the wall of the receptacle, with a space intervening between said rack and the entrance to the spout, said rack adapted to swing within the receptacle with its lower end a slight distance above the bottom of the latter, as set forth.

2. A receptacle for boiling vegetables comprising a body portion having a nose, a rack having longitudinal slots therein, the upper end of the rack having oppositely-projecting arms which are pivotally mounted in apertures in the wall of the receptacle, with a space intervening between said rack and the entrance to the spout, said rack adapted to swing within the receptacle with its lower end a slight distance above the bottom of the latter, a cover, and a strap fastened over the top of the receptacle and adapted to hold the forward edge of the cover to the receptacle, as set forth.

3. A receptacle for boiling vegetables comprising a body portion having a nose, a rack having longitudinal slots therein, the upper end of the rack having oppositely-projecting arms which are pivotally mounted in apertures in the wall of the receptacle, with a space intervening between said rack and the entrance to the spout, said rack adapted to swing within the receptacle with its lower end a slight distance above the bottom of the latter, a cover, a strap fastened over the top of the receptacle and adapted to hold the forward edge of the cover to the receptacle, a loop secured to the kettle, an eye upon the cover over which said loop engages, a key passing through said eye, and a handle for tilting the receptacle, as set forth.

In testimony whereof I hereunto affix my signature in the presence of two witnesses.

ALICE MAUD HAM.

Witnesses:
B. A. BOWEN,
H. HAM.